(12) United States Patent
Lin

(10) Patent No.: US 7,938,260 B2
(45) Date of Patent: May 10, 2011

(54) SHOCK-ABSORBING PROTECTION COVER FOR A PORTABLE PRODUCT

(75) Inventor: Chin-Sheng Lin, Taipei County (TW)

(73) Assignee: Fruitshop International Co., Ltd., Taipei County (TW)

( * ) Notice: Subject to any disclaimer, the term of this patent is extended or adjusted under 35 U.S.C. 154(b) by 9 days.

(21) Appl. No.: 12/498,647

(22) Filed: Jul. 7, 2009

(65) Prior Publication Data

US 2010/0006468 A1 Jan. 14, 2010

(30) Foreign Application Priority Data

Jul. 11, 2008 (TW) .............................. 97212330 U

(51) Int. Cl.
*B65D 85/30* (2006.01)
*B65D 81/02* (2006.01)

(52) U.S. Cl. ..................... 206/320; 206/586; 248/345.1; 267/139

(58) Field of Classification Search .................. 206/305, 206/320, 453, 521, 523, 586; 248/309.1, 248/345.1; 267/139, 140

See application file for complete search history.

(56) References Cited

U.S. PATENT DOCUMENTS

| | | | | |
|---|---|---|---|---|
| 2,993,673 A * | 7/1961 | Villar | ............................. | 206/586 |
| 4,072,231 A * | 2/1978 | Helms | ........................... | 206/453 |
| 4,988,083 A * | 1/1991 | Bradley | .................... | 248/345.1 |
| 5,368,159 A * | 11/1994 | Doria | ........................... | 206/320 |
| 5,648,757 A * | 7/1997 | Vernace et al. | ................ | 206/320 |
| 6,036,155 A * | 3/2000 | Tsui | ........................... | 248/345.1 |
| 6,378,831 B1 * | 4/2002 | Copeland, Jr. | ............. | 248/345.1 |
| 6,616,111 B1 * | 9/2003 | White | ........................ | 248/309.1 |
| 6,682,037 B1 * | 1/2004 | Ouellette | ................... | 248/345.1 |
| 7,630,746 B2 * | 12/2009 | Holmberg | ..................... | 206/320 |
| 2006/0243636 A1 * | 11/2006 | Robichaud et al. | ........... | 206/586 |

* cited by examiner

*Primary Examiner* — Bryon P Gehman
(74) *Attorney, Agent, or Firm* — Rosenberg, Klein & Lee

(57) ABSTRACT

A protection cover is used for sleeving over a portable product so as to help protect the product from being scratched. The protection cover includes a shock-absorbing structure for shielding and concealing a corner of the portable product. The shock-absorbing structure is formed with an air chamber bulging outwardly from the corner of the portable product. The shock-absorbing structure further has an inner region that defines an opening for access into the air chamber and that abuts tightly and sealingly against the corner of the portable product so as to convert the air chamber into an air-trapped chamber when the protection cover is sleeved over the portable product.

5 Claims, 7 Drawing Sheets

SHOCK-ABSORBING PROTECTION COVER FOR A PORTABLE PRODUCT

This application claims the benefit of the Taiwan Patent Application Serial No. 097212330, filed on Jul. 11, 2008, the subject matter of which is incorporated herein by reference.

BACKGROUND OF THE INVENTION

1. Field of the Invention

The present invention relates to a protection cover, more particularly to a soft protection cover for wrapping around a portable product so as to protect the latter from being scratched, impacted or collided.

2. Description of the Prior Art

Protection covers are slipped over or wrapped around some high-cost portable products, like mobile phones or PDAs (personal digital assistants), in order to protect these products from being scratched or impacted accidentally. There are a variety of protection covers available in the market for slipping over the portable products. A few of the protection covers are made from silicone materials and are generally known as "soft protection covers". Silicone is chosen for fabrication of the protection cover due to its easy deformation ability and its specified tight-abutment with an object, in addition to the aesthetic appearance thereof.

Presently, production of soft protection covers is at an initial or early stage. A few ROC patents discloses related art about the production of soft protection covers for slipping over portable products so as to protect the same from being scratched or impacted. These patents show designs for protective covers that are to be used in tight abutment with a portable product to facilitate it being carried by the user. However, these designs provide only limited shock-absorbing abilities in cases where the portable product is dropped and collided against the ground or objects.

One ROC patent proposes to use a relatively thick or expanded soft protection cover to absorb shocks resulting from impacts of the protection cover against an object. The relative thickness of the soft protection cover would provide substantial shock-absorbing ability but as the deformation of the core pad is limited, the impacting force can be transmitted directly to the portable product inside the sleeve, thereby causing a certain degree of damage to the product. In addition, the outwardly bulging soft pads designed for impact resistance add extra mass, bulk and material waste to the sleeve that may not be appreciated by the manufacturer and the consumer.

Therefore the main objective of the present invention is to provide a new design for a soft protection cover for wrapping around a portable product so as to avoid the drawbacks encountered in previously established protection cover inventions.

SUMMARY OF THE INVENTION

One aspect of the present invention is to provide a soft protection cover for wrapping around a portable product so as to prevent the product from being scratched, in addition to absorbing the shocks resulting from an impact against an object, thereby reducing the risks of damage to the product.

The protection cover of the present invention, wrapped around the portable product so as to protect the latter, is made from silicone material and includes a main body and a shock-absorbing structure integrally formed with the main body.

The shock-absorbing structure includes an air chamber bulging outwardly from each corner of the portable product. Therefore, the protection cover of the present invention wraps around the portable product with a shock-absorbing structure that uses an inner region to define an opening for access into the air chamber that abuts tightly and seals against each corner of the portable product so as to convert the recess into an air-trapped chamber when the portable product is encased within the protection cover. In this condition, the portable product is protected from being scratched, and is easier to carry by the user.

BRIEF DESCRIPTION OF THE DRAWINGS

Other features and advantages of this invention will become more apparent in the following detailed descriptions of the preferred embodiment of this invention, with reference to the accompanying drawings, in which.

DETAILED DESCRIPTION OF THE PREFERRED EMBODIMENT

Figure 1:
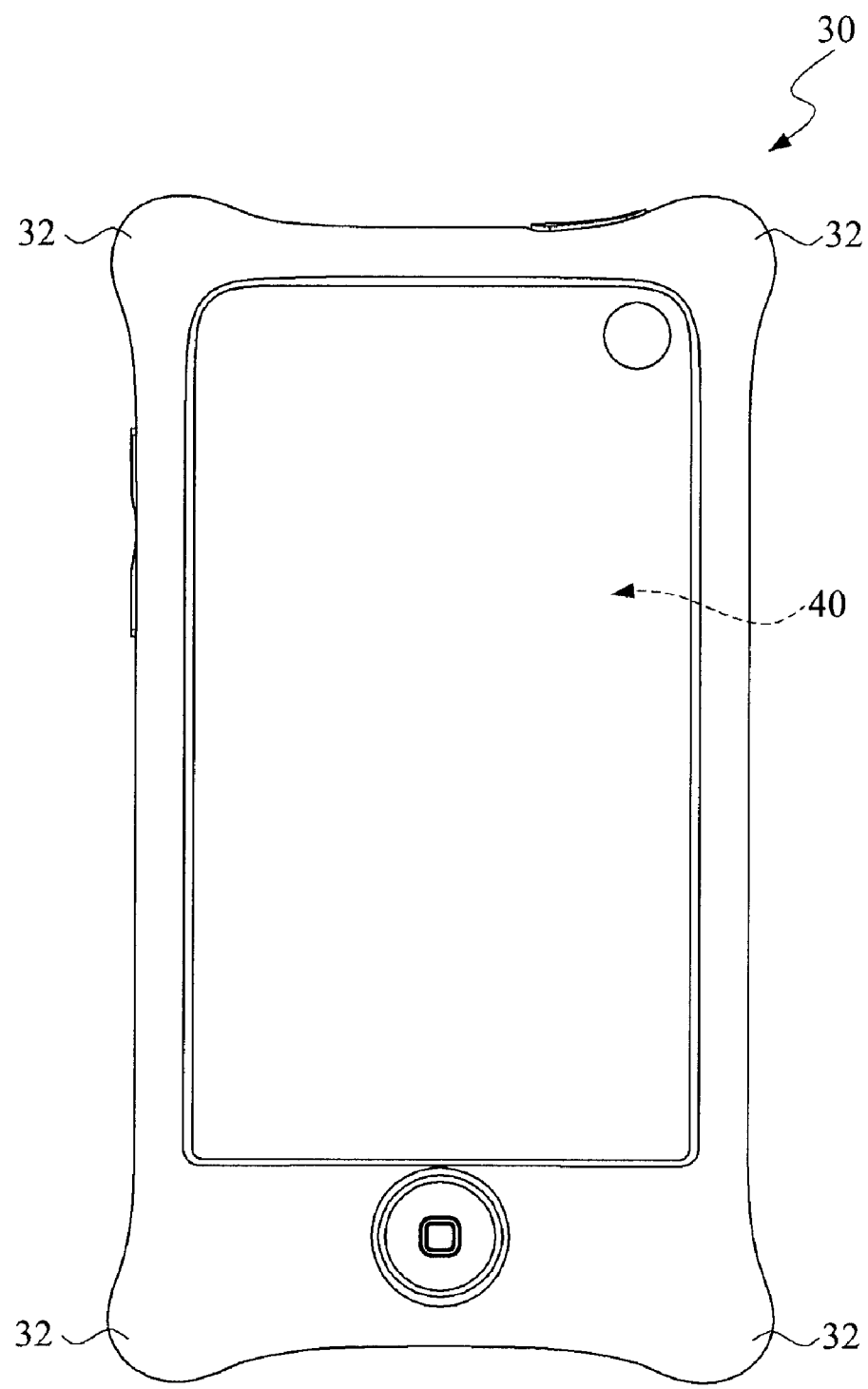
FIG. 1 is a front view of the protection cover of the present invention.

FIG. 1 is a front view of the soft protection cover 30 of the present invention. The soft protection cover 30 of the present invention is used for wrapping around a portable product, such as a mobile phone or PDA. The soft protection cover 30 is preferably made from silicone materials (and other resilient materials). In order to expose a display screen of the portable product 20, the front panel of the soft protection cover 30 forms a display opening 40 via which the display screen of the portable product 20 is exposed when the protection cover is slipped over the portable product 20. In other words, the user can see the display screen of the product 20 through the display opening 40 in the protection cover 30.

Figure 2:
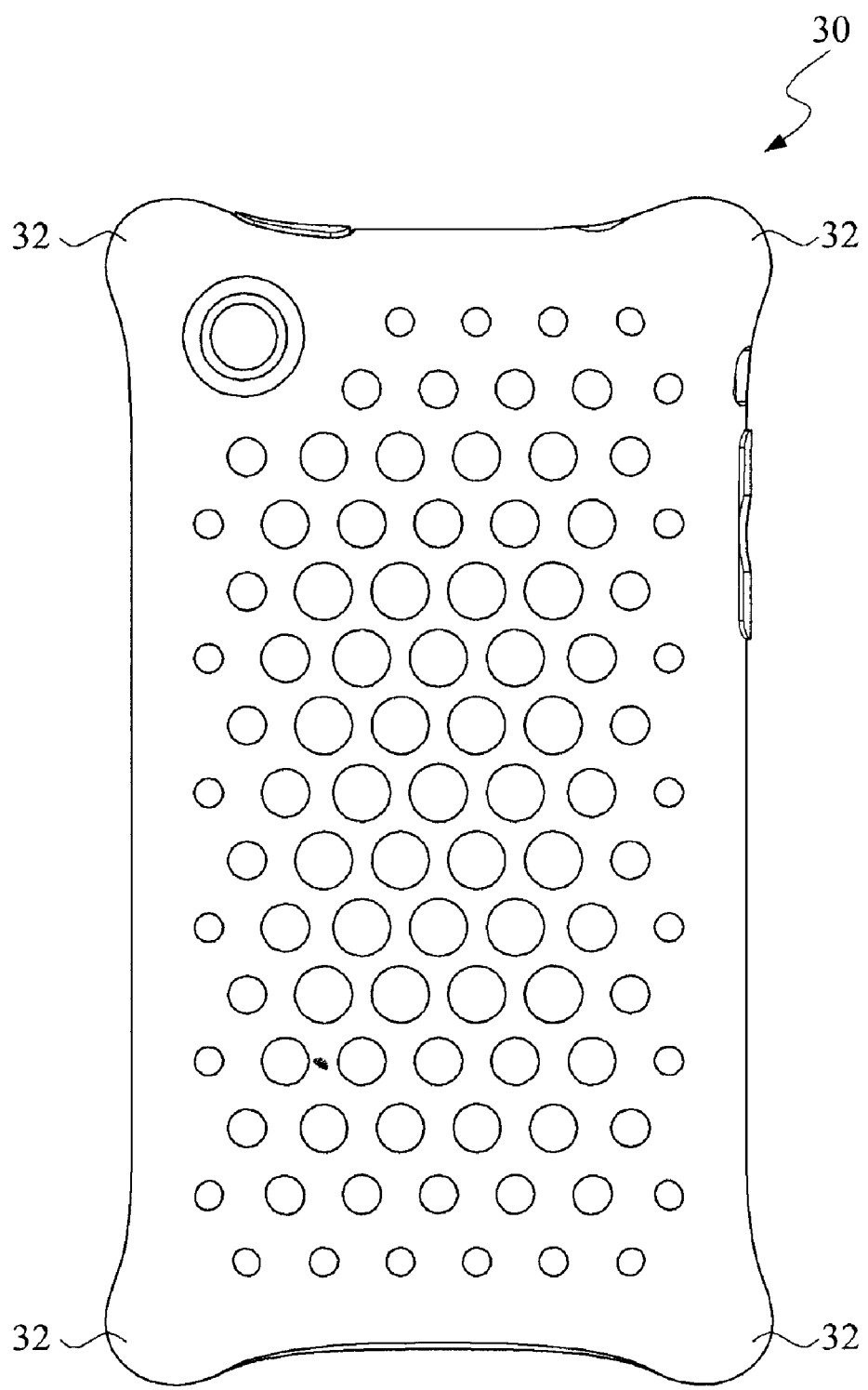
FIG. 2 is a rear view of the protection cover of the present invention.

FIG. 2 is a rear view of the protection cover 30 of the present invention. Since no important elements, such as switches or display screen, are present on the rear side of the product 20, the rear panel of the protection cover 30 entirely conceals the rear side of the product 20 once the protection cover 30 is slipped over the portable product 20.

Referring again to FIGS. 1 and 2, the protection cover 30 of the present invention further includes a main body integrally formed with the shock-absorbing structure 32. As illustrated, four shock-absorbing structures 32 are respectively and integrally formed at the four corners 22 of the product 20, because it is these corners that provide impact resistance so as to help protect the product 20 from being damaged or ruined.

Once the protection cover 30 of the present invention is slipped over the product 20, the shock-absorbing structure 32 at the respective corner 22 of the product 20 has an inner region that defines an opening for access into the air chamber that abuts tightly and seals against the respective corner 22 of the product 20 so as to convert the air chamber into an air-trapped chamber 50 (see FIG. 6), thereby providing an ideal shock-absorbing effect to the product 20.

Figure 3:
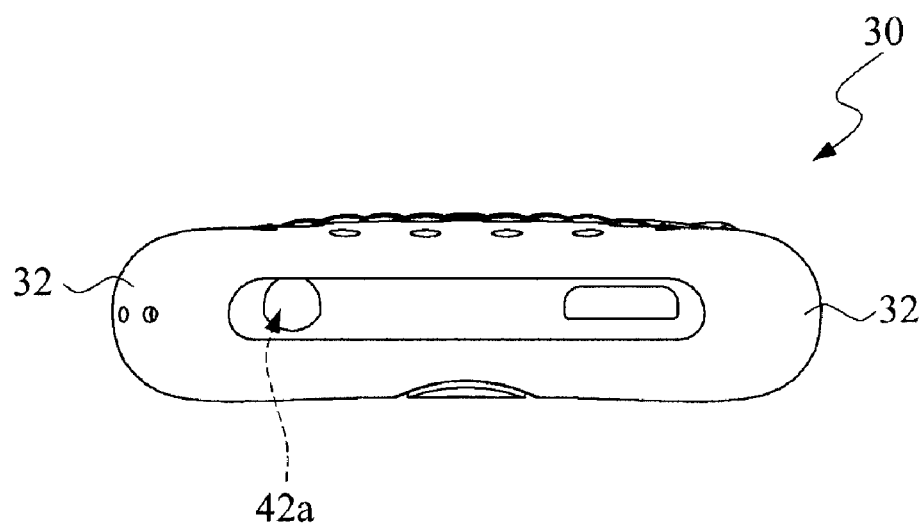
FIG. 3 is a bottom-side view of the protection cover of the present invention.
Figure 4:
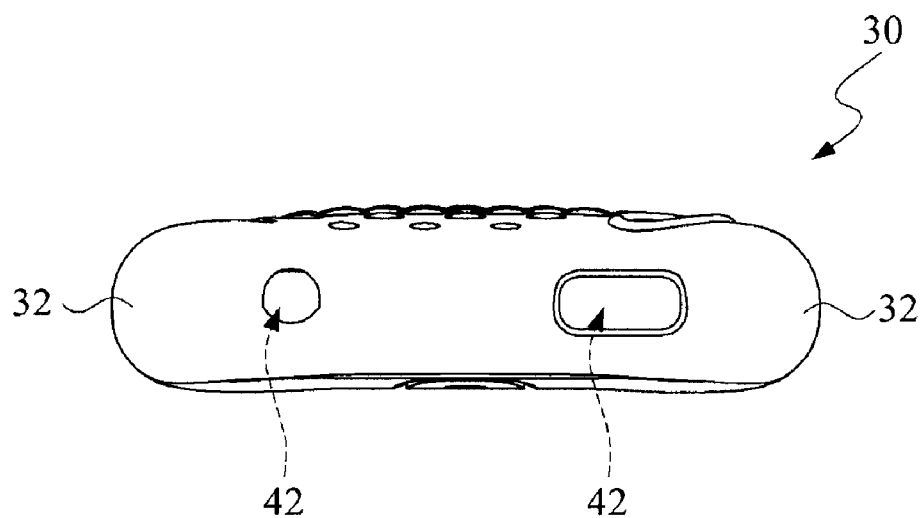
FIG. 4 is a top-side view of the protection cover of the present invention.
Figure 5:
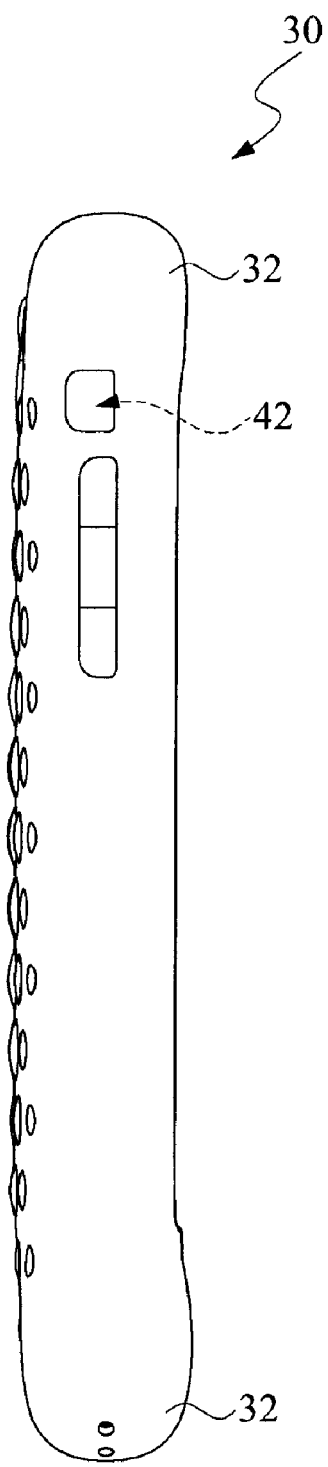
FIG. 5 is a lateral side view of the protection cover of the present invention.

FIG. 3 is a bottom-side view of the protection cover 30 of the present invention. FIG. 4 is a top-side view of the protection cover 30 of the present invention while FIG. 5 is a lateral side-view of the protection cover 30 of the present invention.

In addition, the protection cover 30 of the present inventions is formed with two exposure apertures 42 and 42*a* at its bottom thereof for exposing two connection ports of the portable product 20 to permit connection with terminals of external connectors, such as ear plugs, battery chargers or power sources. Generally, the connection ports for connection to an electronic peripheral device to the portable product are present at the bottom, top and lateral sides of the product 20 so that the connection ports are exposed to the exterior via the exposure apertures 42 and 42*a* formed at the top, bottom, lateral sides or peripheral portions of the protection cover 30.

Figure 6:
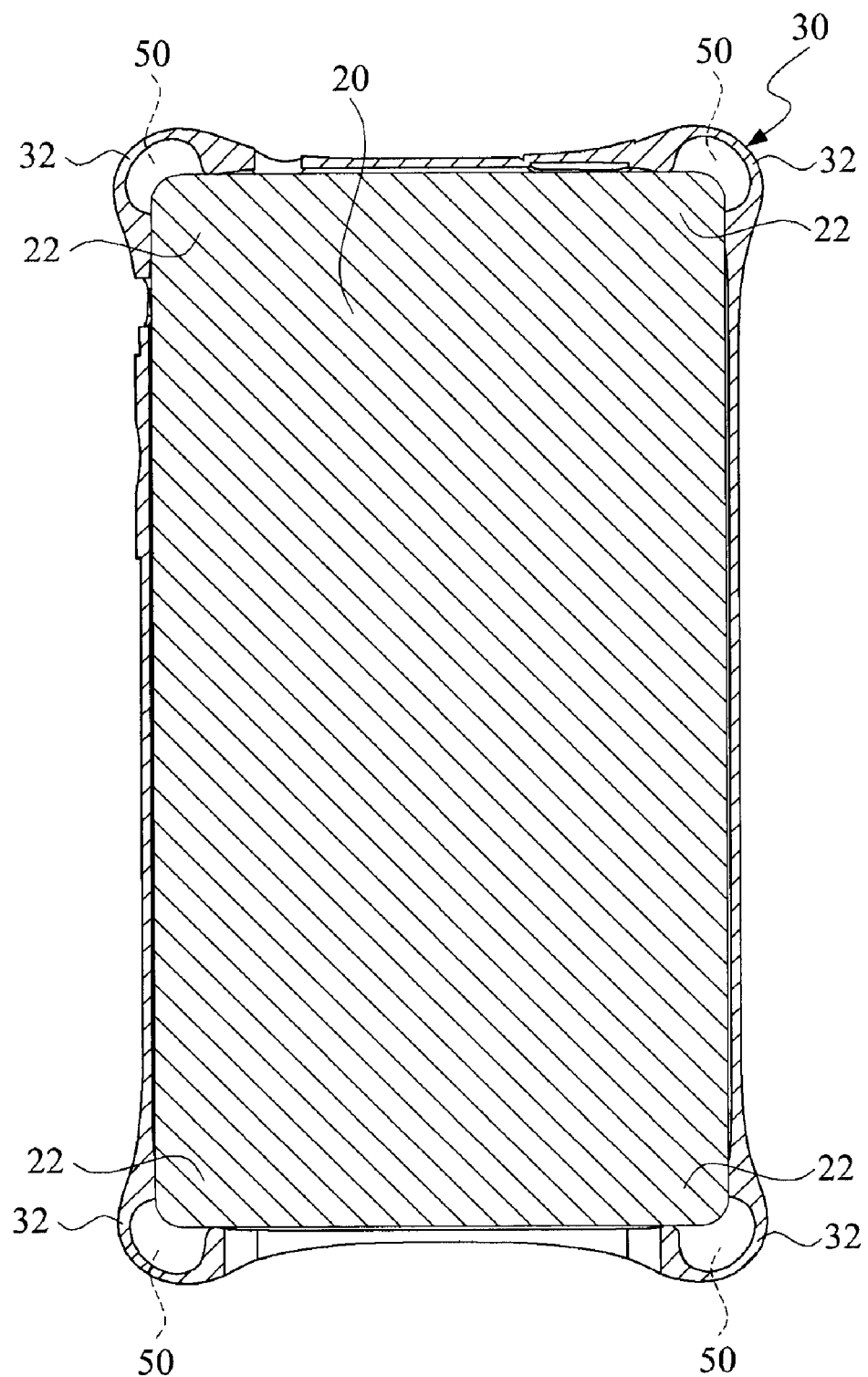
FIG. 6 is a cross-sectional view of the front portion of the protection cover of the present invention.

FIG. 6 is a cross-sectional view of the front portion of the protection cover 30 of the present invention for illustrating the relative position between the shock-absorbing structure 32 and a respective corner 22 of the product 20.

The shock-absorbing structure 32 is formed at the respective corner 22 of the portable product 20 and bulges outwardly from the respective corner 22 as an air-trapped chamber 50. In other words, when the protection cover 30 is wrapped around the portable product 20, the inner region of the shock-absorbing structure, as defined by the access opening, when tightly sealed by abutment against the respective corner 22, converts the air chamber into an air-trapped chamber 50 in such a manner that the respective corner 22 partially extends into the air-trapped chamber 50, thereby reducing a relatively large thinness of the product 20. Thus, the air-trapped chamber 50 provides an ideal shock-absorbing effect.

Due to the presence of the air-trapped chamber 50, the shock-absorbing structure 32 provides an effective deforming and restoring force when the soft protection cover 30 is impacted suddenly.

Figure 7:
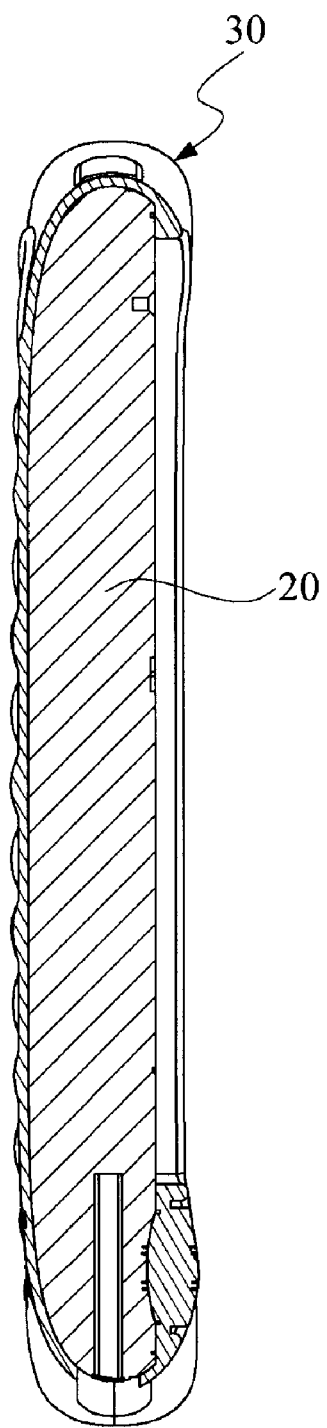
FIG. 7 is a cross-sectional view of the lateral side of the protection cover of the present invention.
Figure 8:
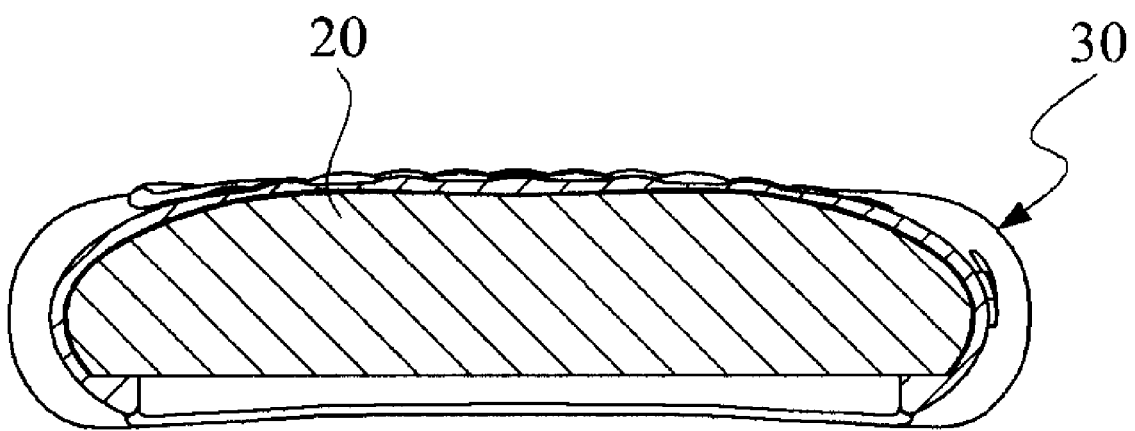
FIG. 8 is a cross-sectional view of the bottom portion of the protection cover of the present invention.

FIG. 7 is a cross-sectional view of the lateral side of the protection cover of the present invention while FIG. 8 is a cross-sectional view of the bottom portion of the protection cover of the present invention. As illustrated, since the soft protection cover 30 is in tight abutment against the portable product once the former is sleeved over the latter, the whole assembly as a whole looks relatively thin in profile and provides an aesthetic appearance. Moreover, since the corner 22 of the product 20 is generally protected by the air-trapped chamber 50 and partially extends into the air-trapped chamber 50, the assembly, as a whole, is relatively thin and is resistant to damage arising from being impacted.

Therefore, once the soft protection cover 30 is sleeved over the portable product 20, the air-trapped chamber of the shock-absorbing structure 32 bulges outwardly from the respective corner 22 so as to help protect the product 20 from being scratched or impacted in addition to facilitating the product 20 in being carried by the user.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A protection cover for sleeving over a portable product, comprising:

a shock-absorbing structure for shielding so as to conceal a corner of the portable product; said shock-absorbing structure including an air chamber bulging outwardly from the corner of the portable product, and said shock-absorbing structure having an inner region defining an opening for access into said air chamber and tightly and sealingly abutting against the corner of the portable product to convert said air chamber into an air-trapped chamber when the protection cover is sleeved over the portable product.

2. The protection cover as defined in claim 1, further comprising a main body integrally formed with said shock-absorbing structure.

3. The protection cover as defined in claim 1, wherein the protection cover is formed with a display opening for exposing a display screen of the portable product when the protection cover is sleeved over the portable product.

4. The protection cover as defined in claim 1, wherein the protection cover is formed with an exposure aperture for exposing a connection port of the portable product to permit connection with an external connector.

5. The protection cover as defined in claim 1, wherein the protection cover is made from silicone material.

* * * * *